United States Patent
Yoon et al.

(10) Patent No.: US 8,014,567 B2
(45) Date of Patent: Sep. 6, 2011

(54) METHOD AND APPARATUS FOR RECOGNIZING GESTURE IN IMAGE PROCESSING SYSTEM

(75) Inventors: Ho Sub Yoon, Daejeon (KR); Su Young Chi, Daejeon (KR); Do Hyung Kim, Daejeon (KR); Hye Jin Kim, Incheon (KR); Jae Yeon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1084 days.

(21) Appl. No.: 11/778,724

(22) Filed: Jul. 17, 2007

(65) Prior Publication Data

US 2008/0019589 A1     Jan. 24, 2008

(30) Foreign Application Priority Data

Jul. 19, 2006   (KR) .................. 10-2006-0067215

(51) Int. Cl.
  *G06K 9/00*   (2006.01)
(52) U.S. Cl. ........ 382/103; 382/165; 382/209; 345/156; 715/863
(58) Field of Classification Search .............. 382/118, 382/100, 103, 190, 165, 209, 218–228; 345/156, 345/173–178; 715/863
See application file for complete search history.

(56) References Cited

U.S. PATENT DOCUMENTS

| | | | |
|---|---|---|---|
| 2002/0168092 A1 | 11/2002 | Doi et al. | |
| 2005/0232480 A1* | 10/2005 | Swift | 382/165 |

FOREIGN PATENT DOCUMENTS

| | | | |
|---|---|---|---|
| CN | 1704966 A | * | 12/2005 |
| JP | 07-282235 | | 10/1995 |
| JP | 8315154 | | 11/1996 |
| KR | 1020030037692 A | | 5/2003 |
| KR | 1020040063153 A | | 7/2004 |
| KR | 20040072286 | | 8/2004 |
| KR | 1020050083515 A | | 8/2005 |
| KR | 1020060107313 | | 10/2006 |
| KR | 1020060109266 | | 10/2006 |
| KR | 1020070046113 | | 5/2007 |
| WO | WO2006/019012 | | 2/2006 |

OTHER PUBLICATIONS

"Dynamic Gesture Recognition." Chris Joslin et al. IMTC 2005—Instrumentation and Measurement Technology Conference, Ottawa, Canada, May 17-19, 2005. © 2005 IEEE.
Notice of Office Action from Korean Intellectual Property Office, Mar. 30, 2007.

* cited by examiner

*Primary Examiner* — Aaron Carter
(74) *Attorney, Agent, or Firm* — Ladas & Parry LLP (57) ABSTRACT

A method and apparatus for recognizing a gesture in an image processing system. In the apparatus, an input unit receives an image obtained by capturing a gesture of a user using a camera. A detector detects a face area in the input image, and detects a hand area in gesture search areas. The gesture search areas being set by dividing the image into predetermined areas with reference to a predetermined location of the detected face area. A controller sets the gesture search areas, determines whether a gesture occurs in the detected hand area, and selects a detection area with respect to the gesture to generate a control command for controlling an image device. A calculator calculates skin-color information and differential-area information for checking a gesture in the detected hand area. Accordingly, a hand area can be accurately detected, and a gesture can be separated from peripheral movement information, so that mal-functioning caused by gesture recognition can be reduced.

20 Claims, 5 Drawing Sheets

METHOD AND APPARATUS FOR RECOGNIZING GESTURE IN IMAGE PROCESSING SYSTEM

CLAIM OF PRIORITY

This application claims the benefit of Korean Patent Application No. 10-2006-0067215 filed on Jul. 19, 2006 in the Korean Intellectual Property Office, the disclosure of which is incorporated herein by reference.

BACKGROUND OF THE INVENTION

1. Field of the Invention

The present invention relates to an apparatus and method for recognizing a gesture, and more particularly, to an apparatus and method for recognizing a gesture in an image processing system such as a TV, a home robot, and a game.

2. Description of the Related Art

Demands for an image processing technology are increasing, which can control devices such as TVs, home robots and games by recognizing a human gesture from an image captured by an image capture device such as a PC (personal computer) camera, a mobile phone camera, and a CCD (charge-coupled device) camera.

For the actual application of the image processing technology to a home environment, the image processing technology for gesture recognition must meet certain conditions. As for the conditions, when recognizing a gesture, the image processing technology must not affected by factors such as lightings, specific backgrounds, and ages, hair styles, makeup and various poses of a user, and must have real-time processing potential.

Recently, various technologies for recognizing a gesture have been developed. Gesture recognition methods of those technologies include a method of recognizing a gesture by continuously obtaining differential images with respect to successive images, a method of using optical flow, and a method of detecting and analyzing a hand area using a color model. Although recognizing a gesture, those methods are problematic in that they satisfy only portions of the above-mentioned conditions, not all of the conditions.

Specifically, the method of obtaining only differential images is problematic in that the method application is difficult in the case where a background is complex or there is another person who is moving. Also, the method of detecting and analyzing an edge of the hand area is disadvantageous when a clothing color of a user is similar to a background color. Also, the method using the optical flow and a method of extracting a body silhouette undesirably consume long time, making the real-time processing difficult. Also, a method of dividing a gesture area using a color model is problematic in that sensitivity to the lightings or backgrounds is too high because the method depends only on colors.

Since a hand area is extracted based only on skin information of the hand area, hand-area detection rates of the conventional methods considerably decrease when the background environment changes or and a user changes a clothing style. Hence, an image processing system employing those conventional methods is not able to clearly recognize a human gesture, thereby experiencing mal-functioning in controlling devices.

SUMMARY OF THE INVENTION

The present invention has been made to solve the foregoing problems of the prior art and therefore an aspect of the present invention is to provide an apparatus and method for recognizing a gesture in an image processing system capable of detecting a hand area on the basis of skin information of a face and background environment information and thus recognizing a gesture to control devices.

Another aspect of the invention is to provide an apparatus and method for processing an image for recognizing a gesture by dividing an area adjacent to a human face and checking a gesture within a limited area to distinguish the gesture from another movement information in a peripheral area.

According to an aspect of the invention, a method for recognizing a gesture in an image processing system includes: detecting a face area in an image captured and input from a camera; dividing the image to predetermined areas with reference to a predetermined location of the face area, and setting the predetermined areas to gesture search areas; detecting a hand area in the gesture search areas; determining whether a gesture occur in the detected hand area; and selecting a detection area with respect to the gesture and transferring an image of the selected detection area as a control command for controlling an image device.

The method may further include switching a resolution of the image of the selected detection area to a high resolution, and switching again the resulting resolution to an initial resolution with reference to a center point to transfer a resulting image as the control command of the image device.

According to another aspect of the invention An apparatus for recognizing a gesture in an image processing system includes: an input unit receiving an image obtained by capturing a gesture of a user using a camera; a detector detecting a face area in the input image, and detecting a hand area in gesture search areas, the gesture search areas being set by dividing the image into predetermined areas with reference to a predetermined location of the detected face area; a controller setting the gesture search areas, determining whether a gesture occurs in the detected hand area, and selecting a detection area with respect to the gesture to generate a control command for controlling an image device; and a calculator calculating skin-color information and differential-area information for checking a gesture in the detected hand area.

The controller may switch a resolution of an image of the selected detection area to a high resolution, switch the high resolution again to an initial resolution with reference to a center point, and transfer a resulting image as a control command of the image device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. In every possible case, like reference numerals are used for referring to the same or similar elements in the description and drawings. In description of the present invention, well-known functions and well-known structures will not be described in detail to avoid ambiguous interpretation of the present invention.

An apparatus and method for recognizing a gesture in an image processing system according to an embodiment of the present invention will be described, which can meet the aforementioned conditions: the image processing system is not affected by factors such as lightings, backgrounds, and appearance (e.g., age, hair style, makeup) and various poses of a user, and has real-time processing potential. Although there may be various application fields of the image processing system, a system for controlling a TV is taken as an example of the image processing system in the following description.

An image processing system according to an embodiment of the present invention will now be described in detail with reference to accompanying drawings.

Figure 1:
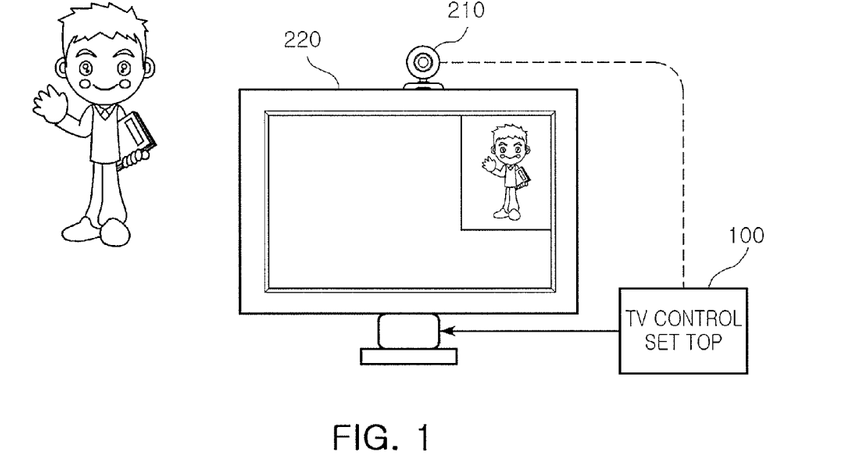
FIG. 1 illustrates construction of an image processing system for gesture recognition according to an embodiment of the present invention.

FIG. 1 illustrates configuration of an image processing system for gesture recognition according to an embodiment of the present invention.

Referring to FIG. 1, an image processing system includes a camera that captures a human movement, a gesture recognizing device 100 that receives a captured image and recognizing an accurate gesture through a face area and a hand area to create a control command, and an image device (hereinafter, referred to as a TV) that is controlled in response to the control command.

The gesture-recognizing device 100 is a TV control set-top (processor). The gesture-recognizing device 100 detects a face area from an image input from the camera 210 to create skin-color information and differential-area information, which is environmental information (e.g., lightings, and backgrounds), and detects an accurate hand area on the basis of the generated information. Also, the gesture recognizing device 100 sets a reference line for gesture recognition, and allocates a gesture search area to use the gesture search area as a detection area for controlling the TV 220. A structure of the gesture-recognizing device 100 will be described in more detail.

Figure 2:
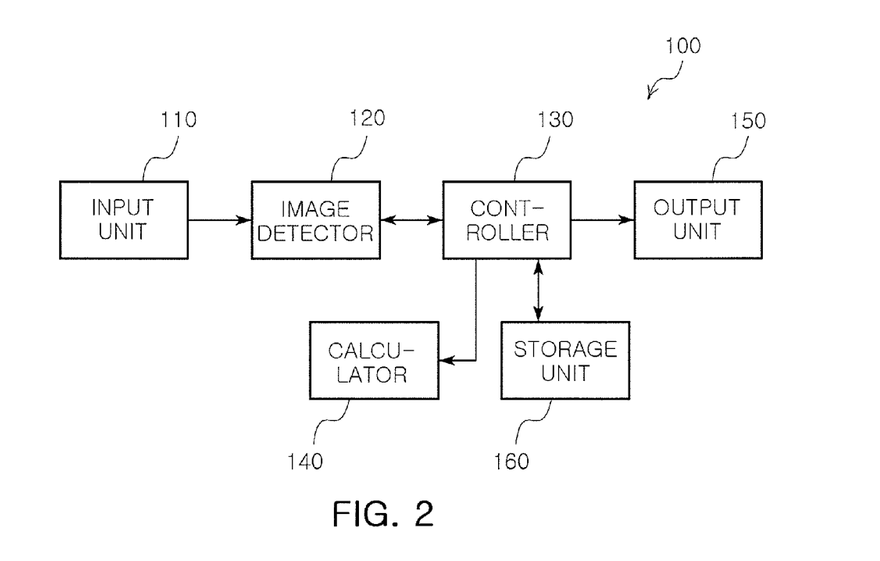
FIG. 2 is a block diagram illustrating a detailed structure of a gesture recognizing device of FIG. 1.

FIG. 2 is a block diagram showing a detailed structure of the gesture-recognizing device of FIG. 1.

Referring to FIG. 2, the gesture-recognizing device 100 includes an input unit 110, an image detector 120, a controller 130, a calculator 140, an output unit 150, and a storage unit 160.

The input unit 110 receives an image captured from the camera.

The image detector 120 detects a face area and a hand area in the input image. Here, to detect a face location, one of a conventional ad a boosting method, an 'openCV' face detector, and a face detector using an axis of symmetry is used.

When a user's face is detected, the controller 130 sets a reference line and a gesture search area for gesture recognition on the basis of a location of the detected face area. The controller 130 examines whether a hand gesture is made in the gesture search area, and outputs a control command to a TV through the output unit 150.

The calculator 140 scans individual R (red), G (green) and B (blue) unit pixels having red, green and blue pixel values in the face area by using a preset algorithm, and compares the unit pixels. When the comparison result meets a preset condition, the corresponding color is determined as a skin color. Then, the calculator 140 uses information of the determined skin color of the face to determine a skin color of a hand area (hereinafter, the information is referred to as skin-color information). The calculation for determining the skin-color will be described in detail in describing Equations 1 and 2.

The calculator 140 calculates a differential image between a previous frame and a current frame in the gesture search area to extract a differential area over time. Then, the calculator 140 combines differential-area information of the differential image with the detected skin-color information to obtain a final image, and then transfers the final image to the controller 130 as differential-area information. Here, the final image is an image with a pixel value of 225, of a skin color area where a gesture is present. The calculation of the differential image and the final image will be described in detail in describing Equation 3 and Equation 4.

Also, the calculator 140 counts the number of pixels (hereinafter, referred to also as count value) in an overlapping area between an area of a previous frame (t−1) and an area of a current frame (t). The calculator 140 determines whether the number of pixels counted (i.e., the count value) is greater than a threshold value (threshold 2), and transmits the determination result to the controller 120 to allow recognition of the gesture.

The storage unit 160 stores the determined skin-color information, and the differential area information, and relevant information of algorithms preset in order to determine the differential area and the skin color of the face and hand areas.

The reference line and the gesture search area set by the controller 130 are reference locations that are preset for TV control through a detection area according to a user's hand gesture. For example, the reference line and the gesture search area may be set as illustrated in FIG. 5.

Figure 5:
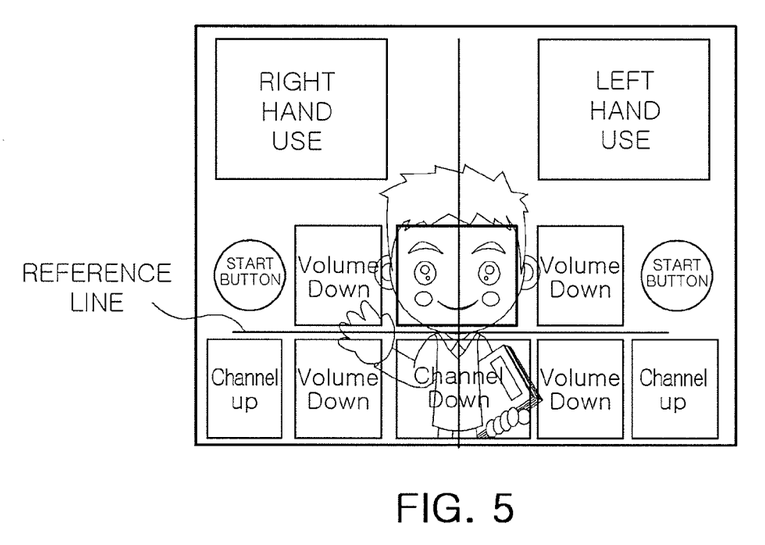
FIG. 5 is a block diagram illustrating setting of a reference location for gesture recognition according to an embodiment of the present invention.

Referring to FIG. 5, in a state where the size and location of a user's face have been found, the user may create a gesture using left and right hands with reference to the face. On the assumption that the user uses a right hand, the controller 130 of the gesture-recognizing device 100 finds a shoulder location of the user on the basis of the face location to create the reference line. When the reference line is created, the user lifts up the hand in a natural manner, and the controller 130 sets a predetermined area between the reference line and the upper face line to a first gesture search area for TV control in proportion to the face size. Likewise, the controller 130 sets a predetermined area below the reference line to a second gesture search area. When the two gesture search areas are allocated, left and right areas to the second gesture search area are set to third and fourth gesture search areas having the similar size. As illustrated in FIG. 5, the four gesture search areas are used as detection areas for controlling the volume and channel of the TV. For example, the first gesture search area may be set to volume up, the second gesture search area may be set to volume down, and the third and four gesture search areas may be set to channel up and channel down.

Also, besides the detection area, the controller 130 may set a start button for turning on/off the TV on the basis of a gesture to a fifth gesture search area. The fifth gesture search area may be set in any location excluding the first to fourth gesture search areas, provided that a user's arm can reach the location. In order for the controller 130 to control on/off of the TV, the aforementioned fifth gesture search area may used, or a specific hand gesture (e.g., rock, scissors, and paper) may be detected in at least one of the first to fourth gesture search areas. In the case where the user uses a left hand, the setting may be performed in the same manner as described above.

A method for recognizing a gesture in the image processing system according to an embodiment of the present having the above-described structure will now be described in detail with reference to accompanying drawings.

Figure 3:
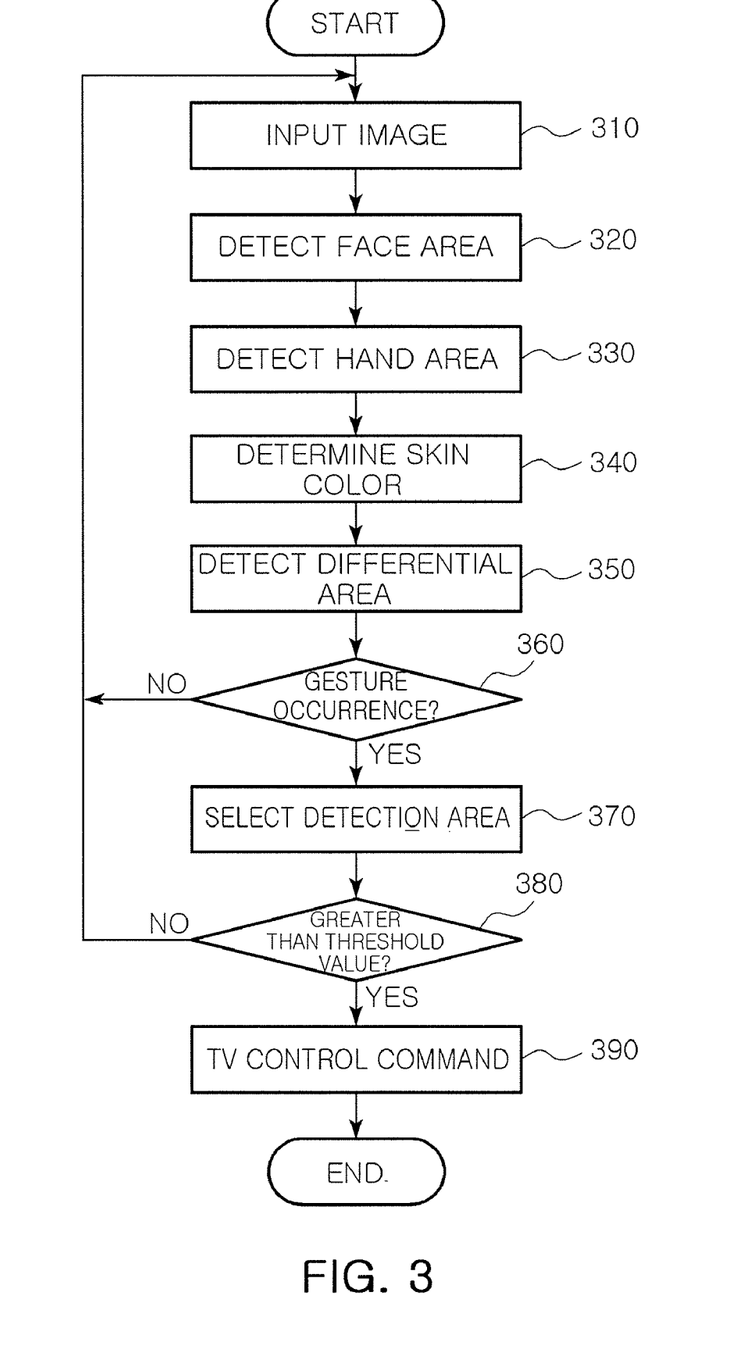
FIG. 3 is a flowchart of a method for recognizing a gesture in an image processing system according to an embodiment of the present invention.

FIG. 3 is a flowchart of a method for recognizing a gesture in the image processing system according to an embodiment of the present invention.

On the assumption that a user views the TV from the front, the camera 210 of FIG. 1 of the image processing system captures the user, and inputs a captured image in the form of a video stream to the gesture-recognizing device 100. Thus, the gesture-recognizing device 100 performs operations as shown in FIG. 3 using the input image.

Figure 6:
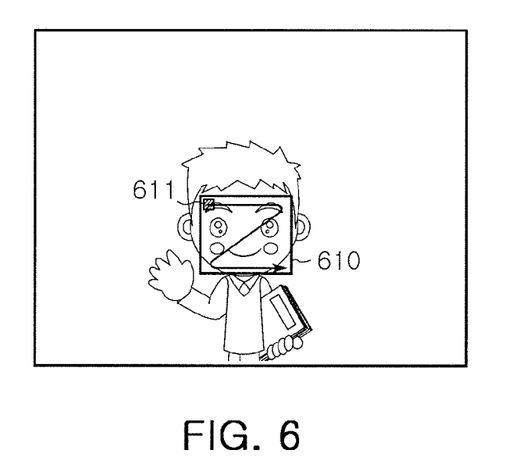
FIG. 6 is a block diagram illustrating skin-color information modeling from a face area according to an embodiment of the present invention.

Referring to FIG. 3, in operation 310, the gesture-recognizing device 100 receives an image captured from the camera. In operation 320, the gesture-recognizing device 100 sets a predetermined candidate area in the input image using a face detector, and then detects a face area in the predetermined candidate area. Then, in operation 330, the gesture-recognizing device 100 searches for a hand gesture within the candidate area with reference to the detected face area. That is, the gesture-recognizing device 100 detects a hand area in each of preset gesture search areas. The hand area may be detected by determining a skin color. Thus, in operation 340, the gesture-recognizing device 100 detects the hand area by determining a skin color using a preset algorithm. Therefore, referring to FIG. 6 illustrating skin-color determination, the gesture-recognizing device 100 scans a detected face area 610 in units of a unit pixel 611 to obtain the maximum and minimum values $R_{max}$, $R_{min}$, $G_{max}$, $G_{min}$, $B_{max}$, and $B_{min}$ of red, green and blue pixel values determined as a skin color. Here, each unit pixel 611 has R, G and B pixel values ranging from 0 to 255. If a candidate pixel meets a preset condition (R>G, R>B), it is considered as a skin color. When the skin color information of the face area is obtained, the calculator 140 of the gesture-recognizing device 100 finally determines a skin color of a hand through Equation 1.

$$T(i, j) = \sum_{i=0, j=0}^{i<Twidth, j<Theight} \begin{cases} 0: \text{if (red} > r_{max} \text{ or red} < r_{min}) \\ 0: \text{if (green} > g_{max} \text{ or green} < b_{min}) \\ 0: \text{if (blue} > b_{max} \text{ or blue} < b_{min}) \\ 255(\text{skin}): \text{Otherwize} \end{cases}$$ [Equation 1]

Figure 7:
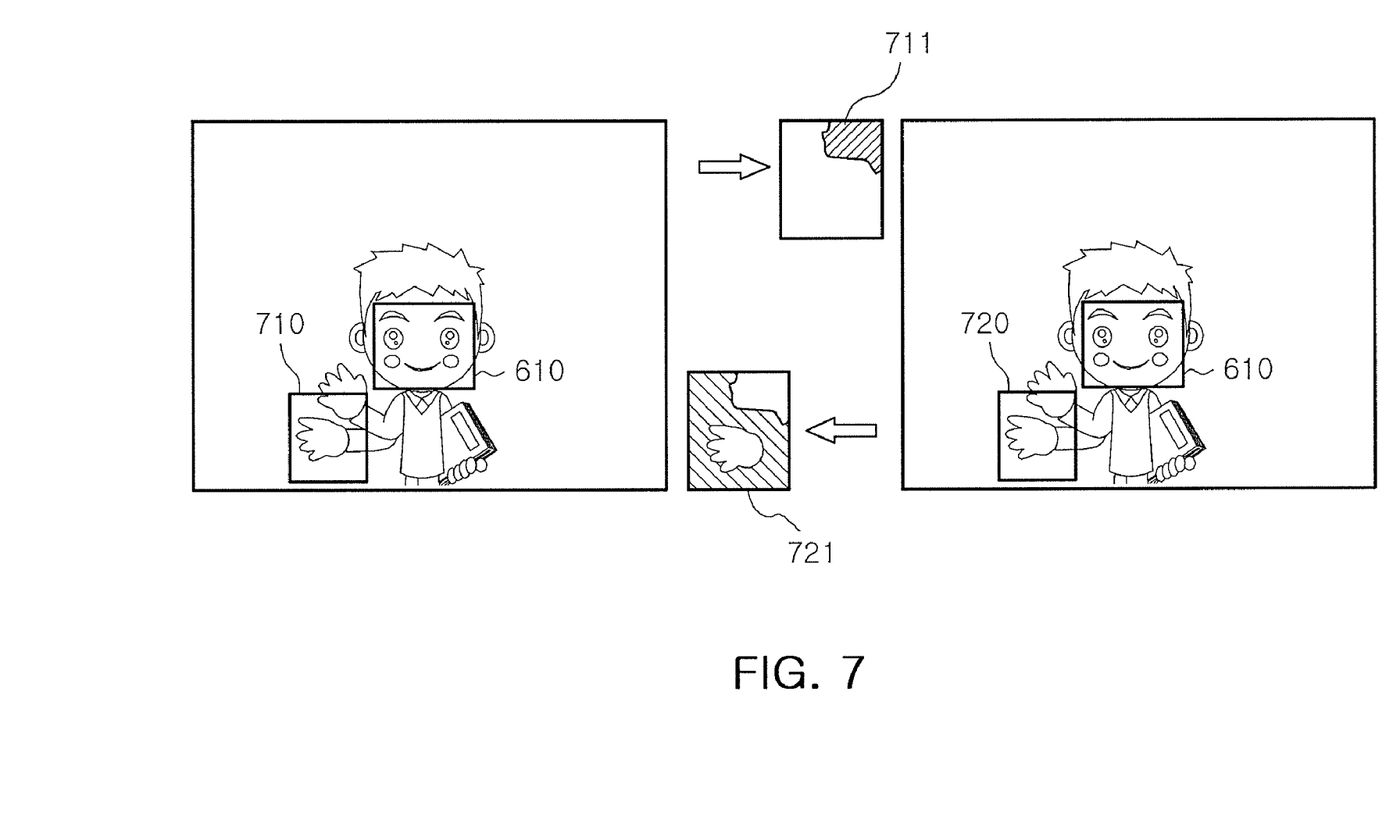
FIG. 7 is a block diagram showing a detection result of a skin-color area, and a detection result of a differential area according to an embodiment of the present invention.

In Equation 1, T(i, j) denotes an image 710 of FIG. 7 of a hand color area that is primarily determined as a skin color within a specific bound (i=0~Twidth, j=0~Theight). In a resulting image obtained in such a manner, the skin color may have too much red. Therefore, the rule such as Equation 2 is applied to remove too much red, and then a final hand color area 711 of FIG. 7 is detected.

$$T_t(i, j) = \sum_{i=0, j=0}^{i<Twidth, j<Theight} \begin{cases} 0: \text{if } (T(i, j) EQ 255 \text{ and red} < \text{blue} * 0.9) \\ 0: \text{if } (T(i, j) EQ 255 \text{ and red} < \text{blue} * 0.9) \\ 0: \text{if } (T(i, j) EQ 255 \text{ and red} * 0.6 > \text{blue}) \\ 0: \text{if } (T(i, j) EQ 255 \text{ and red} * 0.6 > \text{green}) \end{cases}$$ [Equation 2]

In a normal home environment, an area having a color similar to the skin color may exist. In this case, if the gesture is recognized using only the skin color, errors may occur. Therefore, in operation 350, the gesture-recognizing device 100 calculates a differential image between a previous frame and a current frame to detect a differential area 721 as illustrated in FIG. 7. In FIG. 7, to detect the differential area 721 of a hand area 720 of a current frame, a skin-color area 711 of the hand area 710 of a previous frame is detected through the skin-color information of the face area 610. The image of the differential area may be calculated through Equations 3 through 5.

$$D_t(i, j) = \sum_{i=0, j=0}^{i<Twidth, j<Theight} \begin{cases} 255: \text{if } (abs(I_t(i, j) - I_{t-1}(i, j)) > Threshold_1) \\ 0: \text{otherwise} \end{cases}$$ [Equation 3]

$$R_t(i, j) = \sum_{i=0, j=0}^{i<Twidth, j<Theight} \begin{cases} 255: \text{if } (T_t(i, j) EQ 255 \text{ and } D_t(i, j) EQ 255) \\ 0: \text{otherwise} \end{cases}$$ [Equation 4]

In Equation 3, $D_t(i,j)$ denotes a differential image within a predetermined area (i, j) at the time of 't'. Here, abs( ) function denotes the absolute value of a calculation result, $I_t(i, j)$ denotes an intensity value at the time of 't', and $I_{t-1}(i, j)$ denotes an intensity value at the time of 't−1'. Also, in Equation 4, $R_t(i, j)$ denotes a final image with a pixel value of 255 of a skin color area where a gesture is present. The skin-color determination and differential-area detection must be performed on every predetermined gesture detection area.

In operation 360, the controller 130 of the gesture-recognizing device 100 receives the final image calculated through the calculator 140, and combines the skin-color information with the differential-area information to determine whether a gesture is made in an area wider than a predetermined area. Such gesture occurrence may be determined through Equation 5.

$$\sum_{i=0, j=0}^{i<Twidth, j<Theight} \text{count} = 0 \quad \text{if } (R_t(i, j) EQ 255) \text{count} + +; \quad \text{[Equation 5]}$$

if (count > $threshold_2$), gesture occurence

A first threshold value (threshold 1) of Equation 3 falls within a range of 3 to 10, and a second threshold value (threshold 2) of Equation 5 varies according to the size of an input face.

If it is determined in operation 360 that the gesture is not made, operation 310 is performed. If it is determined that a gesture is made in one or more areas, an area having the greatest count value, that is, a detection area, is selected in operation 370. Thereafter, in operation 380, it is checked whether the count value is greater than a preset threshold value. If the count value is greater than the preset threshold value, a TV control command corresponding to the gesture in the selected detection area is transmitted in operation 390. In contrast, if it is checked in operation 380 that the count value is smaller than the threshold value, it means a hand movement is negligible, and thus it is determined that the gesture is made, thereby terminating the operation.

A response to the TV control command using a gesture is made within a second after the gesture is recognized. Although a plurality of gesture commands are recognized within one second, control needs to be made to allow only one command input within one second so that a user can decide whether to make a new command after checking a changed channel or volume. That is, a gesture command and reaction to the gesture command requires time-interval adjustment depending on capacity of a processing processor.

Also, the image processing system detects a face location through a face detector such as an OpenCV, and determines a detection location on the basis of the detected face location. Here, the face detector detects a face whenever a frame is input. However, if a device with low processing power is used, real-time processing becomes difficult due to a speed of the face detector. Therefore, according to an embodiment of the present invention, once a face is detected in one frame, the information on the previously detected face location is continuously used for the next frame, provided that a movement does not occur to greater than a predetermined extent within a face area detected in the previous frame, or a skin-color area obtained by using the algorithms of Equations 1 and 2 exceeds 50% of the detected face area. When a gesture is made at a fixed location, a face is detected only once at the first frame using the afore-mentioned algorithms, and thereafter, processes are performed without detecting the face from the next frame, provided that a user does not move or lighting does not change. Consequently, the total calculation amount is reduced, thereby allowing real-time processing.

In the above-described embodiment of the present invention, it is assumed that a distance between a normal TV and a user is about 2 to 3 m, and an image is received with a resolution of 320×240 to recognize a gesture. However, in the case of a large screen TV, a distance between the TV and a user generally may range from 3 to 5 m. In this case, an image with a higher resolution is needed to detect a face. The real-time recognition and processing of a high-resolution image requires expensive equipment. For this reason, in another embodiment of the present invention, after a face is detected with a resolution of 320×240, the resolution is switched to a high resolution of for example, 640×480, and the resulting image is modified to a 320×240 image with reference to a center point. A method for recognizing a gesture through a long-distance processing using switching of a camera input resolution will now be described with reference to the accompanying drawing according to another embodiment of the present invention.

Figure 4:
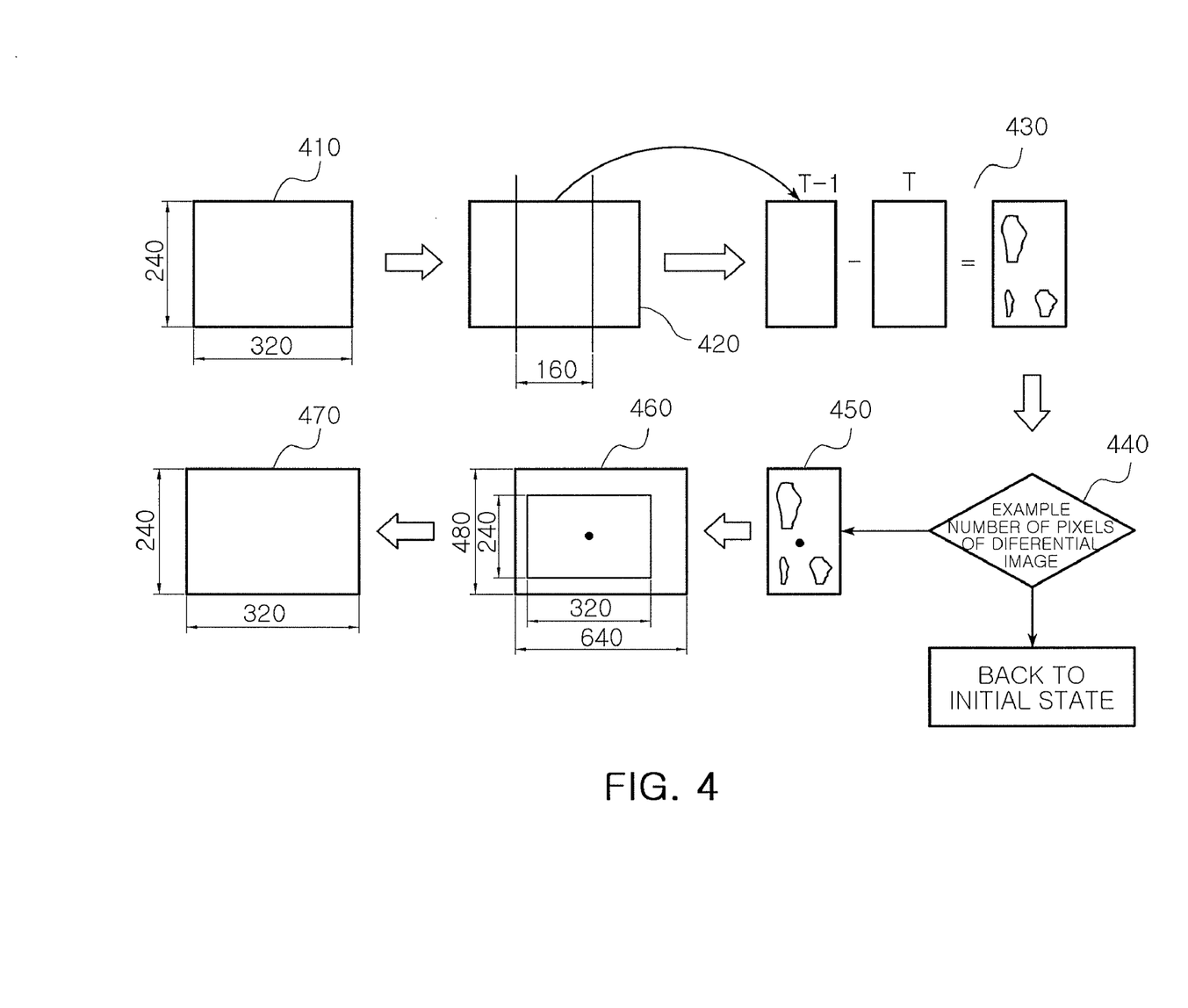
FIG. 4 is a flowchart of a gesture recognition process based on long-distance processing using input-resolution switching in an image processing system according to another embodiment of the present invention.

FIG. 4 is a flowchart illustrating a gesture recognition process according to long-distance processing employing input-resolution switching in an image processing system according to another embodiment of the present invention.

Referring to FIG. 4, in operation 410, an image processing system receives an image with a low-resolution of 320×240 from a camera, and detects a face area. Thereafter, in operation 420, the image processing system defines a candidate area, that is a hand area (e.g., 240×160) on the basis of a face location within the detected face area. In operation 430, a difference between a previous frame and a current frame is calculated within the defined candidate area to generate a differential image. In operation 440, the image processing system counts the number of pixels (count value) of the generated differential image, and determines whether the number of pixels counted (count value) is greater than a preset threshold value. If it is determined in operation 440 that the number of pixels counted (count value) is smaller than the threshold value, a mode returns to an initial state. Since the operation is the same as the aforementioned embodiment of the present invention, the detailed description of the operation will be omitted.

In contrast, if it is determined in operation 440 that the number of pixels counted (count value) is greater than the threshold value, the image processing system selects a center point among entire movement pixels of the generated differential image in operation 450. Thereafter, in operation 460, the image processing system switches the resolution of the differential image to a high resolution of 640×180, and then sets a low-resolution (320×240) area in the resulting image with reference to the center point. Next, in operation 470, the modified low-resolution area is output, thereby achieving both real-time processing and long-distance processing.

Unlike the above-described embodiments, in an image processing system according to other embodiments of the present invention, a gesture search area may be set and used as a detection area in such a manner that an image is output from a camera to a predetermined area of a TV, and a user controls the TV by grabbing, pulling, or pushing, for example, a button or a object of the image being output within a preset section of the TV.

As set forth above, according to exemplary embodiments of the invention, the image processing system recognizes a gesture and generates a control signal to allow a user to control an image device such as a TV, a home robot, and a game by making simple gestures without using a remote controller. Thus, the present invention may be effective for people who suffer from poor sight, or the disabled as well as ordinary people.

Since an accurate hand area can be detected by using skin-color information and environment information, and gesture search areas are set, a gesture can be recognized separately from another movement information, so that undesired operation caused by incorrect gesture recognition can be reduced.

While the present invention has been shown and described in connection with the preferred embodiments, it will be apparent to those skilled in the art that modifications and variations can be made without departing from the spirit and scope of the invention as defined by the appended claims.

What is claimed is:

1. A method for recognizing a gesture in an image processing system, the method comprising:
   detecting a face area in an image captured and input from a camera;
   dividing the image to predetermined areas with reference to a predetermined location of the face area, and setting the predetermined areas to gesture search areas;
   detecting a hand area in the gesture search areas;
   determining whether a gesture occur in the detected hand area; and
   selecting a detection area with respect to the gesture and transferring an image of the selected detection area as a control command for controlling an image device
   wherein the determining of the gesture occurrence comprises:
   determining a skin color of the detected hand area by determining skin-color information of the face area;
   calculating a differential image of the hand area between a previous frame and a current frame;
   combining differential-area information of the differential image with the determined skin-color information to obtain a final image; and
   recognizing gesture occurrence from the final image when an overlapping area between the differential area information and the skin color information is larger than a predetermined area.

2. The method according to claim 1, further comprising switching a resolution of the image of the selected detection area to a high resolution, and switching again the resulting resolution to an initial resolution with reference to a center point to transfer a resulting image as the control command of the image device.

3. The method according to claim 1, wherein the determining of the skin-color information of the face area comprises:
   scanning individual red (R), green (G), and blue (B) unit pixels having a red pixel value, a green pixel value, and a blue pixel value in the face area using a preset algorithm;
   comparing the scanned R, G and B unit pixels; and
   determining a skin color when a result of the comparing meets a predetermined condition to create skin color information of the face area.

4. The method according to claim 3, wherein the preset condition is that the red pixel value is greater than the green pixel value and the blue pixel value in the scanned R, G and B unit pixels of the face area.

5. The method according to claim 1 or 3, wherein the determining of the skin color of the detected hand area comprises calculating a hand color area (T(i, j)) in a predetermined area (i, j) using the skin-color information of the face area through a preset algorithm of the following equation:

$$T(i, j) = \sum_{i=0, j=0}^{i<Twidth, j<Theight} \begin{cases} 0: \text{if } (red > r_{max} \text{ or } red < r_{min}) \\ 0: \text{if } (green > g_{max} \text{ or } green < b_{min}) \\ 0: \text{if } (blue > b_{max} \text{ or } blue < b_{min}) \\ 255(skin): \text{Otherwise.} \end{cases}$$

6. The method according to claim 5, wherein the determining of the skin color of the detected hand area comprises calculating a final hand color area ($T_f(I, j)$) by removing an area where a red pixel value greater than a predetermined value is determined as a skin color from the calculated hand color area (T(i, j)) through a preset algorithm of the following equation:

$$T_t(i, j) = \sum_{i=0, j=0}^{i<Twidth, j<Theight} \begin{cases} 0: \text{if } (T(i, j) EQ 255 \text{ and } red < blue * 0.9) \\ 0: \text{if } (T(i, j) EQ 255 \text{ and } red < blue * 0.9) \\ 0: \text{if } (T(i, j) EQ 255 \text{ and } red * 0.6 > blue) \\ 0: \text{if } (T(i, j) EQ 255 \text{ and } red * 0.6 > green). \end{cases}$$

7. The method according to claim 1, wherein the calculating of the differential image comprises obtaining an image where an absolute value (abs( )) of a value obtained by subtracting an intensity value ($I_{t-1}(i, j)$) at a previous frame time (t−1) from an intensity value ($I_t(i, j)$) at a current frame time (t) is greater than a first threshold value (threshold 1) in a predetermined area (i, j) through a preset algorithm of the following equation:

$$D_t(i, j) = \sum_{i=0, j=0}^{i<Twidth, j<Theight} \begin{cases} 255: \text{if } (abs(I_t(i, j) - I_{t-1}(i, j)) > Threshold_1) \\ 0: \text{otherwise.} \end{cases}$$

8. The method according to claim 1, wherein the calculating of the final image comprises calculating a final image with a pixel value of 255 by combining the differential area information ($D_t(I, j)$) of the differential image with the detected skin-color information (T(i, j)) through a preset algorithm of the following equation:

$$R_t(i, j) = \sum_{i=0, j=0}^{i<Twidth, j<Theight} \begin{cases} 255: \text{if } (T_t(i, j) EQ 255 \text{ and } D_t(i, j) EQ 255) \\ 0: \text{otherwise.} \end{cases}$$

9. The method according to claim 1, wherein the recognizing of the gesture occurrence comprises recognizing gesture occurrence when an overlapping information count value between the differential area information and the skin-color information is greater than a second threshold value (threshold 2) through a preset algorithm of the following equation:

$$\text{count} = 0$$
$$\sum_{i=0, j=0}^{i<Twidth, j<Theight} \text{if } (R_t(i, j) EQ 255) \text{count} + +;$$
$$\text{if } (\text{count} > threshold_2), \text{ gesture occurrence.}$$

10. The method according to claim 1, wherein the dividing of the image to the predetermined areas with reference to the predetermined location of the face area and the setting of the predetermined areas to the gesture search areas comprises:
    dividing the image into a left-hand area and a right-hand area with reference to a face location of the face area;
    setting a reference line at a location randomly spaced apart from the face location; and
    setting the predetermined areas to gesture search areas for controlling the image device in the left or right hand areas with reference to the reference line.

11. An apparatus for recognizing a gesture in an image processing system comprising:
- an input unit receiving an image obtained by capturing a gesture of a user using a camera;
- a detector detecting a face area in the input image, and detecting a hand area in gesture search areas, the gesture search areas being set by dividing the image into predetermined areas with reference to a predetermined location of the detected face area;
- a controller setting the gesture search areas, determining whether a gesture occurs in the detected hand area, and selecting a detection area with respect to the gesture to generate a control command for controlling an image device; and
- a calculator calculating skin-color information and differential-area information for checking a gesture in the detected hand area
- wherein the controller switches a resolution of an image of the selected detection area to a high resolution, switches the high resolution again to an initial resolution with reference to a center point, and transfers a resulting image as a control command of the image device.

12. The apparatus according to claim 11, wherein the controller divides the image into a left-hand area and a right-hand area with reference to a face location of the face area, sets a reference line at a location randomly spaced apart from the face location, and sets predetermined areas to gesture search areas for controlling the image device in the left and right hand areas with reference to the reference line.

13. The apparatus according to claim 11, wherein the calculator scans individual red (R), green (G), and blue (B) unit pixels having a red pixel value, a green pixel value, and a blue pixel value in the face area using a preset algorithm, compares the scanned R, G and B unit pixels, and determines a skin color when a result of the comparing meets a predetermined condition to create the skin color information of the face area.

14. The apparatus according to claim 13, wherein the preset condition is that the red pixel value is greater than the green pixel value and the blue pixel value in the scanned R, G and B unit pixels of the face area.

15. The apparatus according to claim 11, wherein the calculator determines a skin color of the detected hand area by determining skin-color information from the face area, obtains a differential image of the hand area between a previous frame and a current frame, and combines differential area information of the differential image with the determined skin-color information to obtain a final image.

16. The apparatus according to claim 15, wherein the calculator calculates a hand color area ($T(i, j)$) in a predetermined area ($i, j$) using the skin-color information of the face area through a preset algorithm of the following equation:

$$T(i, j) = \sum_{i=0, j=0}^{i<Twidth, j<Theight} \begin{cases} 0 : \text{if } (red > r_{max} \text{ or } red < r_{min}) \\ 0 : \text{if } (green > g_{max} \text{ or } green < b_{min}) \\ 0 : \text{if } (blue > b_{max} \text{ or } blue < b_{min}) \\ 255(skin) : \text{Otherwise.} \end{cases}$$

17. The apparatus according to claim 16, wherein calculator calculates a final hand color area ($T_f(I, j)$) by removing an area where a red pixel value greater than a predetermined value is determined as a skin color from the obtained hand color area ($T(i, j)$) through a preset algorithm of the following equation:

$$T_f(i, j) = \sum_{i=0, j=0}^{i<Twidth, j<Theight} \begin{cases} 0 : \text{if } (T(i, j)EQ255 \text{ and } red < blue * 0.9) \\ 0 : \text{if } (T(i, j)EQ255 \text{ and } red < blue * 0.9) \\ 0 : \text{if } (T(i, j)EQ255 \text{ and } red * 0.6 > blue) \\ 0 : \text{if } (T(i, j)EQ255 \text{ and } red * 0.6 > green). \end{cases}$$

18. The method according to claim 15, wherein the calculator obtains an image where an absolute value (abs( )) of a value obtained by subtracting an intensity value ($I_{t-1}(i, j)$) at a previous frame time (t−1) from an intensity value ($I_t(i, j)$) at a current frame time (t) is greater than a first threshold value (threshold 1) in a predetermined area ($i, j$) through a preset algorithm of the following equation:

$$D_t(i, j) = \sum_{i=0, j=0}^{i<Twidth, j<Theight} \begin{cases} 255 : \text{if } (abs(I_t(i, j) - I_{t-1}(i, j)) > Threshold_1) \\ 0 : \text{otherwise.} \end{cases}$$

19. The method according to claim 18, wherein the calculator calculates the final image having a pixel value of 255 by combining the differential area information ($D_t(I, j)$) of the differential image with the detected skin-color information ($T(i, j)$) through a preset algorithm of the following equation:

$$R_t(i, j) = \sum_{i=0, j=0}^{i<Twidth, j<Theight} \begin{cases} 255 : \text{if } (T_t(i, j)EQ255 \text{ and } D_t(i, j)EQ255) \\ 0 : \text{otherwise.} \end{cases}$$

20. The method according to claim 19, wherein the controller recognizes gesture occurrence when an overlapping information count value between the differential area information and the skin-color information is greater than a second threshold value (threshold 2) through a preset algorithm of the following equation:

$$count = 0$$

$$\sum_{i=0, j=0}^{i<Twidth, j<Theight} \text{if } (R_t(i, j)EQ255)count++;$$

if (count > $threshold_2$), gesture occurrence.

* * * * *